United States Patent [19]

Breddan

[11] Patent Number: 4,489,386
[45] Date of Patent: Dec. 18, 1984

[54] DEVICE CONTROL SYSTEM
[75] Inventor: Joseph A. Breddan, Boulder, Colo.
[73] Assignee: AT&T Bell Laboratories, Murray Hill, N.J.
[21] Appl. No.: 345,341
[22] Filed: Feb. 3, 1982
[51] Int. Cl.³ .................. G06F 15/56; G05B 15/00
[52] U.S. Cl. ........................................ 364/493; 307/35
[58] Field of Search ............... 364/492, 493, 164, 165; 307/35, 38, 39, 62

[56] References Cited

U.S. PATENT DOCUMENTS

| | | | |
|---|---|---|---|
| 3,872,286 | 3/1975 | Putman | 364/493 X |
| 3,906,242 | 9/1975 | Stevenson | 364/493 X |
| 3,998,093 | 12/1976 | Bertolasi | 73/112 |
| 4,023,043 | 5/1977 | Stevenson | 364/493 X |
| 4,141,069 | 2/1979 | Fox | 364/493 |
| 4,211,933 | 7/1980 | Hedges | 307/35 |
| 4,266,097 | 5/1981 | Cannon et al. | 179/2 A |
| 4,357,665 | 11/1982 | Korff | 364/493 X |

Primary Examiner—Edward J. Wise
Attorney, Agent, or Firm—James M. Graziano

[57] ABSTRACT

The subject device control system provides a new method of determining when resource consuming loads are to be disabled to prevent the total resource consumption from exceeding a predetermined threshold. This system bases the decision making process on past consumption, past load shedding activity and predicted future load activity. The controlling algorithm is applied to the present resource consuming situation for a plurality of different time interval configurations and the worst case result of these computations is used to control the load shedding.

25 Claims, 4 Drawing Figures

DEVICE CONTROL SYSTEM

TECHNICAL FIELD

This invention relates to a device control system and, in particular, to a consumption monitor arrangement which monitors the operation of a number of resource consuming devices, predicts their future activity and regulates their operation. The controlling purpose is to maintain the overall demand (which is defined to be the rate of consumption over a specified interval of time) for the resorce below a predetermined demand threshold. The device control system thereby functions with improved efficiency to permit resource consumption at a level very close to the demand threshold but guaranteed (to a high degree of confidence) not to exceed the predetermined demand threshold.

BACKGROUND ART

There have been numerous prior art device control systems, generally in the field of electrical energy consumption. Some prior art control systems operate on a crude load shedding basis, by disabling an energy consuming load when the predetermined demand threshold is reached and maintaining the energy consuming load in the shed state for an extended period of time. These prior art control systems suffer from a tendency to overreact to peak loads by shedding too many energy consuming loads for too extended a period of time, thereby reducing the operating efficiency of the customer's equipment which the system is designed to control. Other prior art control systems underregulate the energy consuming loads, permitting the demand to exceed the demand threshold too frequently.

DESCRIPTION OF THE INVENTION

The subject device control system solves these problems by providing a sophisticated device control arrangement which estimates, to a high degree of precision, the minimum load which must be shed to prevent the predetermined demand threshold from being exceeded. To accomplish this, the past performance of the resource consuming loads in the system is monitored and future load activity is estimated on an iterative basis to develope an accurate picture of the past, present and future controlled device activity. The resultant information is compared with the predetermined demand threshold. The result of this comparison is used to precisely regulate the resource consuming devices which are under the control of the subject device control system such that the maximum demand is satisfied without exceeding the predetermined demand threshold.

DETAILED DESCRIPTION OF THE DRAWINGS

Figure 1:
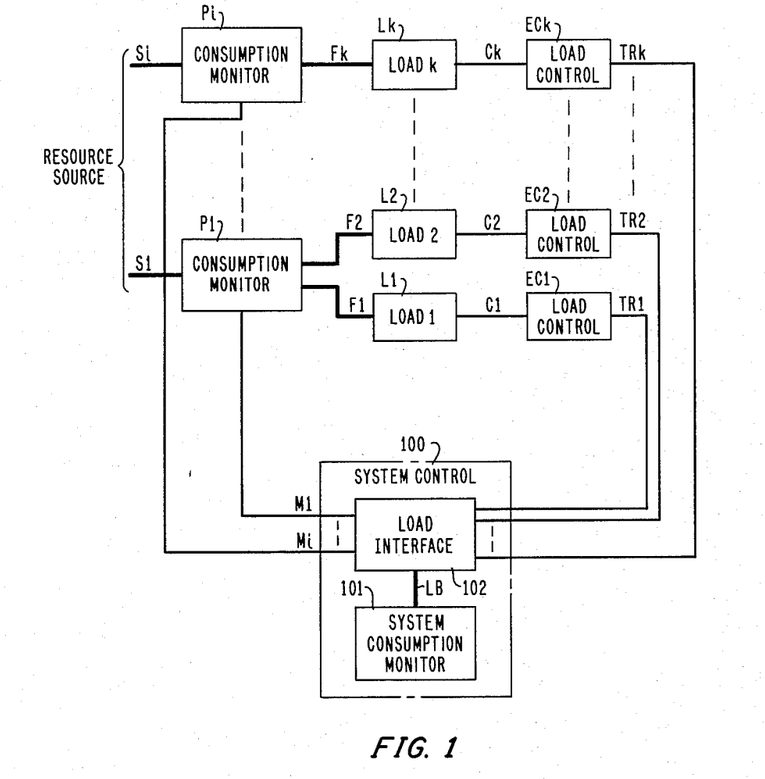
FIG. 1 illustrates, in block diagram form, the overall system aspects of the subject device control system.

FIG. 1 illustrates, in block diagram form, the preferred embodiment of the device control system of my invention. This system controls a plurality of devices or loads (L1-Lk), which devices utilize some resources, the rate of consumption of which is to be controlled. The system of FIG. 1 is a generalized system arrangement which, in a typical application, would be implemented to control the rate of electrical energy consumption on a customer's premises. Such an implementation of this system can be seen in U.S. Pat. No. 4,266,097 issued to T. B. Cannon et al on May 5, 1981 wherein the device control system uses a stored program business communication system to regulate the operation of various energy consuming devices.

The devices or loads (L1-Lk), illustrated in FIG. 1, very likely would be the heating, ventilating and air conditioning (HVAC) equipment which is operational on the customers premises. This HVAC equipment L1-Lk will be assumed to be powered by commercial 60 Hz ac line voltage (identified as "resource source" on FIG. 1) which is supplied by service lines S1-Si to a like plurality of consumption monitors P1-Pi and thence via power feed lines F1-Fk to loads L1-Lk, respectively. Consumption monitors P1 through Pi can be arranged on a one to one basis with an associated load or may monitor the consumption of a plurality of loads, as determined by the needs of the system. In the electrical energy consumption case, consumption monitors P1 through Pi would be power meters which measure the amount of electricity consumed by the associated loads and which power meters output a signal indicative of this consumption to system control 100 on leads M1 through Mi, respectively. Consumption monitors P1-Pi are shown on FIG. 1 as series connected devices, although they could be connected in the bridged mode, dependent upon the meter design and the resource to be monitored.

ENERGY CONTROL UNITS EC1-ECk

The plurality of loads L1-Lk illustrated in FIG. 1 are assumed, for this description, to be controlled by a like plurality of energy control units (EC1-ECk) which are associated on a one to one basis with loads L1-Lk via leads C1-Ck respectively. A plurality of loads can be controlled by a single energy control unit but, for simplicity of description, the one-to-one configuration will be used. The energy control units EC1-ECk may also be powered by the commercial 60 Hz ac line voltage. The energy control units EC1-ECk enable their associated HVAC loads L1-Lk to operate under control of their internal thermostats or other regulatory circuitry until selected ones of energy control units EC1-ECk receive appropriate control signals from system control 100 via leads TR1-TRk. This control function is activated when system consumption monitor 101 determines that a load should be disabled and places an appropriate set of signals on bus LB to load interface 102. Load interface 102 is a multiplexer circuit which translates the control signals on bus LB to an appropriate activation signal which is to be applied to the designated one or ones of leads TR1 through TRk to thereby activate the associated energy control unit to disable the load that it controls. When an energy control unit, such as unit EC1, receives the control signal on the associated control lead (TR1), the energy control unit EC1 terminates the operation of the associated load (L1) by overriding the operation of the internal thermostat or control circuitry of HVAC equipment L1 via lead C1.

Figure 2:
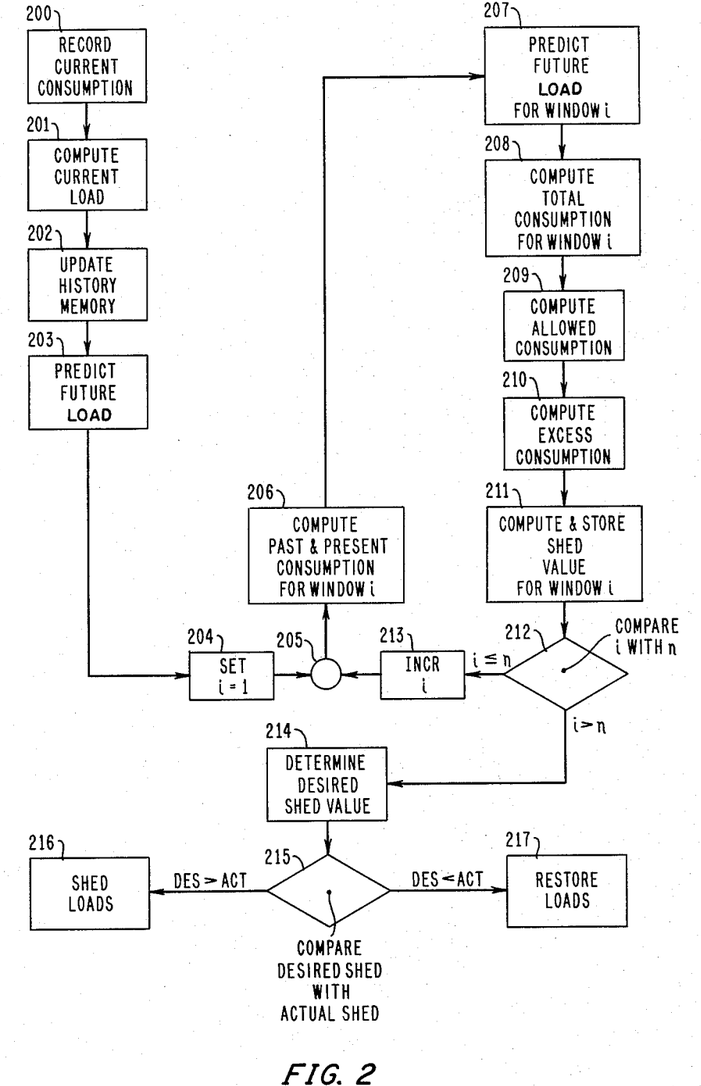
FIG. 2 depicts the details of the system consumption monitor circuit for the floating window demand interval.

A detailed description of a typical energy control unit can be found in the above-referenced T. B. Cannon et al patent as can a description of load interface 102, which would comprise the line circuits, tone trunk, switching network and power meter interface of the Cannon patent. Thus, the particular control elements described above are well-known in the art, and it is the control circuitry of system consumption monitor 101 which significantly departs from prior device control systems. System consumption monitor 101 is shown in FIG. 2 and illustrates the preferred embodiment of the control arrangement that is used in the device control system of FIG. 1 to provide the desired load control operation.

SYSTEM CONSTRAINTS

In the consumption of a resource, there are numerous economic or legal constraints upon the consuming customer which forces bounds upon the resource consuming activity. In the electricity consumption area, a significant factor is the severe economic penalty imposed by the load utility company upon excessive peak loads caused by a customer. Avoiding this economic penalty, which is imposed by the utility company, is a significant motivating force in selecting an implementation of the subject device control system to control electricity consumption. The parameters defining peak demand vary from utility company to utility company but demand is defined to be the average energy consumption rate of a particular customer over a predetermined fixed interval of time, called a demand interval. The highest value which the demand reaches during the billing period is the peak demand, and the customer is generally charged a fixed dollar amount per kilowatt of the peak by the utility company. Thus, the customer sets the demand threshold to the lowest possible level that is still high enough not to interfere seriously with the day-to-day operation of the business in order to minimize the cost of the resource.

DEMAND INTERVAL

Each demand interval is comprised of a fixed number n of monitoring intervals. For example, a demand interval may be a 15 minute period which consists of 15 one minute monitoring intervals. Thus, the device control system must monitor the on-going energy consumption of the customer and shed sufficient loads to assure that the electrical energy demand during this demand interval does not exceed the predetermined demand threshold. In calculating the demand, a demand interval called a "fixed window" is sometimes used in which each demand interval begins at a predetermined time, where the demand intervals do not overlap in time. However, if the customer knows both the duration of this fixed window and the start time of the fixed window, he can spread his peak load activity over two fixed windows by activating the devices which cause the peak load just prior to the end of one fixed window and the beginning of the next. In order to avoid such manipulations, which still cause the peak load at the utility, many local utility companies are switching to a "floating window" mode of analysis where the demand for any and every possible demand interval (which in many cases means a demand calculation is made each minute) cannot exceed the predetermined demand threshold. This prevents the customer from attempting to insert a peak load on-line at the boundary of a window which is fixed in time. Thus, the subject device control system must operate under the assumption that the current monitoring interval appears at any and every possible point within a fixed duration demand interval. This enables the subject system to operate asynchronously with respect to the utility company monitoring intervals. The subject system accomplishes this by iteratively analyzing the current consumption, past consumption and predicted future activity.

SYSTEM CONSUMPTION MONITOR

FIG. 2 illustrates the implementation of system consumption monitor 101 wherein these functions are accomplished. The system illustrated in FIG. 2 may be implemented in any one of a number of ways: by analog devices, software routines on a digital computer, hardwired digital logic or many other conceivable implementations. For the sake of economics, system consumption monitor 101 would probably be implemented by a software package run on a microprocessor or a minicomputer and the following discussion will be based on the assumption that the implementation is such. Thus, FIG. 2 can be viewed as a system state diagram which illustrates the functions realized in system consumption monitor 101. Given this level of detail, any competent practitioner of the engineering or computer arts could suitably design a circuit or program the selected processor in straightforward fashion to provide a particular implementation.

FIXED WINDOW

The system disclosed in FIG. 2 is an implementation used for device control in the above-mentioned floating window demand interval constraint situation. However, the control scheme for the floating window includes an iterative repetition of the fixed window scheme. It is therefore advantageous to first describe a system implementation (shown in FIG. 3) used for device control in a fixed window environment. Thus, system consumption monitor 101 analyzes past and future system performance for a predetermined demand interval. For the purpose of presenting an example, we will consider the case where n, the number of monitoring intervals in the fixed window demand interval, is equal to 15 and the identity of the present monitoring interval, (represented by i in FIG. 2) is equal to 10. The present monitoring interval is always assumed to have just ended when the calculations discussed below begin. The example characterizes a situation where, for this system, there are fifteen monitoring intervals in a demand interval and the system is presently ending the tenth monitoring interval during the fixed window or demand interval. System consumption monitor 101 therefore has five remaining monitoring intervals during which the energy consuming loads can be disabled or reactivated so that the maximum load is supplied to the energy consuming loads without exceeding the predetermined demand threshold.

Figure 3:
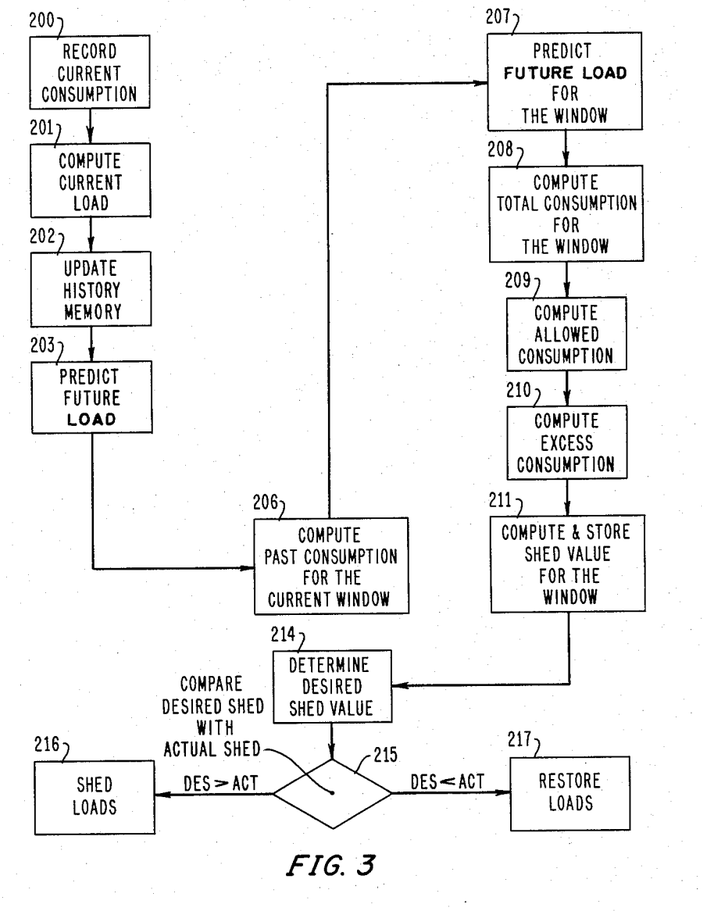
FIG. 3 depicts the details of the system consumption monitor circuit for the fixed window demand interval.

State 200 in FIG. 3 illustrates the first step of operation of system consumption monitor 101 and consists of the determination of the present electrical energy consumption during the present monitoring interval. This is accomplished by load interface 102 summing the output of consumption monitors P1-Pi and transmitting the resultant sum to system consumption monitor 101 via bus LB. When this sum is received, system consumption monitor 101 advances to state 201 which is the computation of the "current load" which is the sum of the present active energy consuming load and the load that would have been presented by the devices that are disabled by the subject system. This operation represents a conversion of the raw data obtained from consumption monitors P1-Pi and the data stored in system consumption monitor 101 to a set of consumption figures indicative of the presently active and presently disabled loads. The result of this computation is stored in the memory of system consumption monitor 101 as illustrated by state 202 wherein this information is read into two history files or memories (not shown) of system consumption monitor 101. Thus, system consumption monitor 101 contains a listing of the loads shed and the actual consumption for each monitoring interval of the entire previous demand interval.

HISTORY FILES

Before proceeding with the description of the states depicted in FIG. 3, a slight digression is in order. At this point the system has progressed through state 202 and the result has been the compilation of history files for two types of quantities. One file is set up for a history of the actual consumption figures for each of the previous n monitoring intervals (often this amounts to a minute by minute history). The second file is used to record a history of what the consumption figures (for each of those same n monitoring intervals) would have been had there been no loads shed during those monitoring intervals.

The use of these two separate history files is one of the key elements of the subject system and is discussed here in some detail. The basic approach in the fixed window scheme (detailed below) is to attempt to predict what the demand would be at the end of the window if no control action is taken (i.e., if no loads are shed) between the current moment and the end of the window. This quantity will be compared with the allowed demand, and control actions will be taken if the prediction is higher than allowed. Again the details of how this is done are presented below, but the point here is that the two separate history files are needed to come up with the best possible prediction of what the demand would be at the end of the window if no control actions are taken from the present moment forward.

The demand prediction is considered as consisting of two separate parts. One is the consumption which has taken place thus far in the window. This can be determined precisely by summing the figures from the first history file (actual consumption) for the monitoring intervals which occurred in the current window. The second part of the demand prediction consists of predictions for what will be consumed in each of the monitoring intervals remaining in the window (if no loads are shed). These predictions are done on the basis of (possibly among other things) the entries in the second history file (once again, details will follow).

The reason for the separate history file being kept for the case where no loads are shed is to provide a common denominator from which to base predictions. Prior art control schemes explicitly or implicitly attempt to base predictions on actual consumption data points which are kept in the first history file in this system. Since different quantities may have been shed in each of the previous monitoring intervals, these data points can essentially be on different footings, and basing predictions on them therefore increases the probable error factor.

The terminology used in the detailed description below has the potential for being a bit confusing, but the following points should help clarify any potential misunderstanding. The term "load" is used in two different ways. The term is often used to refer to a resource consuming device (i.e., a control action results in loads being shed). The term is also used to describe the total system request for the resource. In this context, the second history file keeps track of the load that the system experienced in each of the previous n monitoring intervals. The difference between the two uses of the word "load" is usually made clear by the context. The word "consumption" usually refers to actual consumption, as kept in the history file. Perhaps the biggest potential for confusion arises from the fact that at some point in the control scheme, we must add together a consumption figure (to represent what has been consumed thus far) and a load figure (to predict what will happen in the monitoring intervals remaining in the window), in order to come up with the demand prediction. For the purposes of this discussion (and the state diagrams) this total will be called a "consumption" figure in spite of the fact that it includes components of what we are calling "load".

PREDICTION

Proceeding with the description of system states, the system consumption monitor 101 next advances to state 203 wherein system consumption monitor 101 estimates the load for each monitoring interval remaining in the current window and stores these results in a future file (not shown) of system consumption monitor 101. This prediction operation typically would be a function of the actual consumption taken over the entire previous demand interval and extrapolated over the entire subsequent demand interval. Thus, the future load would be the estimated consumption of all presently active loads plus the estimated consumption of all the loads presently in the shed state. Once this consumption prediction has been completed, an analysis is activated by advancing to state 206.

Function 206 obtains from the history file, the values of actual consumption for all of the monitoring intervals in the current window which have elapsed (a total of ten in the example). Upon completion of this task, system consumption monitor 101 activates function 207 which obtains the values of predicted load for the monitoring intervals remaining in the fixed window (which, in the example, is five intervals) from the future file. As a result of these two memory read operations, function 208 is enabled to compute a prediction of how much of the resource will be consumed during the entire window if no loads are shed between the present amount and the end of the fixed window. System consumption monitor 101 activates function 209 which generates a figure indicative of the allowed consumption for the window. Function 210 is enabled by this result to compute the difference between allowed consumption and the consumption determined to be applicable to the energy consuming loads during the window. This difference represents the amount of consumption which must be avoided via load shedding by the end of the window if the threshold is not to be exceeded. System consumption monitor 101 then activates function 214 which computes the load to be shed based upon the above-determined difference value. The load to be shed is a function of the total excess consumption divided by the number of monitoring intervals remaining in the window. Thus, function 214 outputs a number which indicates the load per monitoring interval that must be shed to avoid exceeding the predetermined demand threshold. This output from function 214 activates function 215 which compares this output with an indication of the loads presently shed and determines whether function 216 or 217 should be activated to respectively shed additional loads or restore already shed loads to the active state. Thus, system consumption monitor 101 performs an analysis of the demand based not only on past consumption but also on predicted future load activity, taking into account the loads presently disabled.

FLOATING WINDOW

Figure 4:
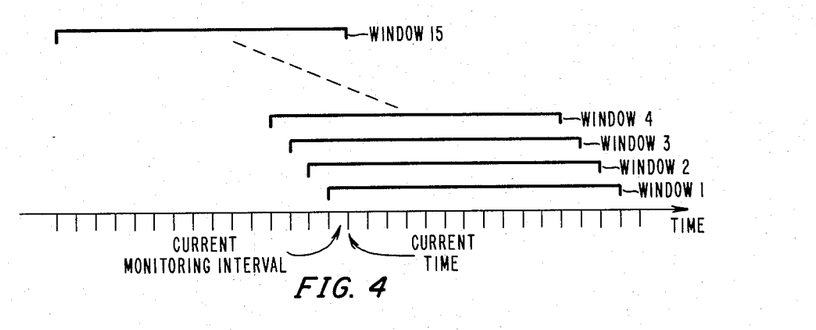
FIG. 4 represents a timing diagram for the consumption monitor circuit of FIG. 2.

The same basic system structure is used for the floating window case as can be seen by the system structure illustrated in FIG. 2. The approach for the floating window is a conceptual extension of the fixed window case. If there are n monitoring intervals in the demand interval, then the current monitoring interval can be thought of as being contained in n different fixed windows, each of which results in a demand calculation which is considered in determining the peak. This approach is illustrated in FIG. 4 wherein the horizontal axis across the figure indicates time (divided into monitoring intervals) with both the present monitoring interval and the present time indicated. Above this axis, the time span of window 1 is indicated, wherein the current monitoring interval plus the subsequent or future $n-1$ monitoring intervals are considered in completing the demand calculation as discussed above. Window 2, as shown on FIG. 4, is time-shifted one monitoring interval so that the demand calculation includes the subsequent $n-2$ monitoring intervals, the current monitoring interval and the last past monitoring interval. It is obvious from FIG. 4 that all subsequent windows are similarly time-shifted so that all possible window configurations which include the present monitoring interval are considered. Thus, in this situation, i (in states 204 through 208, and 211 through 213 in FIG. 2) would be a variable and an iterative analysis, of the type described above, would be activated n times or once for every possible demand interval configuration that would include the present monitoring interval.

Thus, system consumption monitor 101 enables function 204 which sets the window width to n monitoring intervals and sets the variable $i=1$ so that the analysis (states 205-213) is performed n times. The purpose of this iterative analysis is to develop a profile of every possible demand interval that includes the present monitoring interval. In this fashion, the system operation can be controlled so that the peak demand does not exceed the demand threshold for any and every possible demand interval. The combined prediction and recording activity in this analysis is what renders the resultant load shed determination so accurate.

Thus, the first possible demand interval that includes the present monitoring interval is the one wherein $i=1$. In this case, the first monitoring interval in the demand interval has just ended and there are 14 monitoring intervals remaining in the window wherein a change in device activity can be effected. System consumption monitor 101 branches at state 205 to a computation function 206 which reads the value of variable i and then computes the present and past consumption for window i. The first time through the loop, $i=1$ and the relevant data includes a listing of the activity for the present monitoring interval as listed in the history file of system consumption monitor 101. This single past consumption entry is combined by function 207 with the predicted future load in this window, where the future load is the total of the predicted loads for the next $n-1$ monitoring intervals, as estimated during the prediction step of function 203. These entries are all summed by system consumption monitor 101 enabling function 208 to obtain a number indicative of consumption for all n monitoring intervals of the demand interval which comprises the first window. System consumption monitor 101 then advances to state 209 where it computes the permitted consumption based on the demand threshold which applies to this system. A comparator function is performed at step 210 to compare the total demand for this first window as computed by system consumption monitor during step 208 with the allowed demand as determined by system consumption monitor 101 during step 209. The difference between these two factors is calculated and the resultant figure is an indication of the excess consumption for the first window. This excess consumption figure is divided in step 211 by the number of monitoring intervals remaining in this window to come up with a figure indicative of the load to be shed for each monitoring interval remaining in this window in order that the demand threshold is not exceeded. In this case, since this is the first window, there remain $n-1$ monitoring intervals during which a correction can be effected in order not to exceed the demand threshold. Thus, any excess demand computed during step 210 must be compensated for within the remaining $n-1$ monitoring intervals, and so step 211 divides the result of step 210 by $n-1$.

Since there is an indeterminate starting time for the window monitored by the utility company, the set of computations in steps 205-212 must be reiterated n times so that the worst case condition can be identified and then appropriate corrections made. A comparison is made in step 212 wherein the variable i is compared with the constant n to determine whether all possible window configurations have been realized. In the case just described, only the first window has been studied and $i=1$, so system consumption monitor 101 branches to state 213 where i is incremented by 1. System consumption monitor 101 again branches at state 205 to step 206 which reflects the process wherein the computation of past, present and future activities in this new window is determined. The case where $i=2$ considers actual consumption figures for two monitoring intervals, and predicted load values for $n-2$ monitoring intervals. Any excess consumption computed in state 210 is divided by $n-2$ in state 211. The same logic applies for $i=3,4,\ldots n-1$. The case where $i=n$ is slightly different. Since all n monitoring intervals have passed, it is too late to effect the outcome for that window, but it is not too early to begin making decisions to effect the next window. Hence, in the case where $i=n$ all n data points represent predicted load values for future monitoring intervals. Also, the calculation in step 211 is typically a division by n (since there are n monitoring intervals remaining in the window in question). The program which runs on the processor in system consumption monitor 101 repeats steps 206-213 n times so that each possible window configuration is analyzed and the shed values for each window are stored in a shed table (not shown) of system consumption monitor 101. When the table entries have all been generated, system consumption monitor 101 branches to state 214 where these table entries are analyzed to determine the total desired load to be shed in the system. This analysis typically would be a simple determination of the maximum shed value listed in the table to guarantee that the predetermined threshold is not exceeded. This maximum shed value is then passed to a comparator operation in step 215 where it is compared with the actual load presently shed by the system to determine whether more loads need to be shed or whether too many loads have been shed and some can be switched back on line. If too many loads have been shed, the system consumption monitor 101 would branch to state 217 wherein loads would be switched back to the active state. This function is performed in well-known fashion to enable the selected loads to resume normal operation. If insufficient loads have presently been shed, system consumption monitor 101 would branch to state 216 wherein additional loads would be shed by system consumption monitor 101 placing the appropriate control signals on bus LB. There control signals will be translated by load interface 102 to an activation signal or signals which are transmitted to the designated ones of load control EC1 to ECk thereby disabling the associated loads to reduce system consumption.

ADDITIONAL FEATURES

The structure just described can be implemented in any one of a number of ways depending largely on the computing power of the processor contained in system consumption monitor 101, the real time constraints on the system and the level of sophistication required by the customer. The future load prediction function of step 203 was indicated to be a simple averaging function of past and present loads although this is not necessarily the case. It is apparent that in many systems, loads can be predicted on a time-wise basis such as the activation of lighting in a parking lot at dusk or the activation of heating and air conditioning equipment at a certain time prior to opening a commercial premises. These factors can easily be fed into the prediction function of step 203. Another factor to be considered in the prediction function would be a trend analysis to determine whether the loads are on a continuing increase or decrease to thereby more accurately predict the action to be taken in the future so that the customers equipment can be run at maximum load without exceeding the predicted demand threshold to a high degree of confidence. Another variation in this system can be in the determination of the load to be shed during step 214. In this situation, analysis can be done of the entire table of shed values to determine whether the maximum value stored therein is within a reasonable boundary in relationship to the other values stored in the table. A single value greatly in excess of the other values stored in the table may, in some cases, be ignored as an odd perturbation of the system (such as a nonrecurring short-term load) or could be discounted by and averaging operation in the system control function. This type of decision could of course, be moderated by an analysis of how many monitoring intervals are left in this window during which the control function can be activated. If there remains only a single future monitoring interval, the determination of how much load to be shed would be significantly different than for the window wherein n−1 monitoring intervals remain for the exercise of the control function. The decision making process can also include a consideration of the number of predictions contained in the demand interval of interest. Obviously, the demand intervals having fewer predictions are more reliable, and hence should carry more weight than estimates based primarily on predictions. Thus, the system structure described in FIG. 2 has a large number of potential implementations depending upon the system structure and the penalties associated with exceeding the predetermined demand threshold. The structure described in FIG. 2 is a typical implementation which illustrates the generic iterative activity required to effect system control in a floating window environment.

While a specific embodiment of the invention has been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the spirit and the scope of the invention.

What is claimed is:

1. In a device control system having a plurality of devices which are connected to and controlled by said device control system a method of controlling the operation of said devices comprising:
   monitoring the load presented by the active ones of said devices on a periodic basis to obtain a periodic load indication;
   storing a plurality of consecutive ones of said indications;
   predicting the load for a plurality of successive future intervals;
   generating a set of data comprising said plurality of indications and said data representative of the predicted activity for said future intervals;
   comparing of said set of data against a set of predetermined criteria; and
   regulating the operation of said devices based on the result of said comparison.

2. In a device control system having a plurality of devices which are connected to and controlled by said device control system a method of controlling the operation of said devices comprising:
   monitoring the load presented by the active ones of said devices on a periodic basis to obtain a periodic load indication;
   storing a plurality of consecutive ones of said indications;
   predicting the load for a plurality of successive future intervals;
   generating a like plurality of sets of data comprising said plurality of indications with each successive set having the oldest indication from the previous set being replaced with data representative of the predicted activity for the next successive future interval;
   comparing each of said sets of data against a set of predetermined criteria; and
   regulating the operation of said devices based on the result of said comparisons.

3. The invention of claim 1 or 2 wherein the step of monitoring includes the step of:
   estimating the load request presented by the shed ones of said devices.

4. The invention of claim 3 wherein the step of storing includes the step of:
   storing a plurality of consecutive ones of said load requests.

5. The invention of claim 4 wherein said step of predicting includes the steps of:
   summing the current load presented by said active ones of said devices plus said load request presented by said shed ones of said devices; and
   extrapolating the result obtained from said summing step for a plurality of successive future intervals.

6. The invention of claim 4 wherein the step of predicting includes the steps of:
   computing the load trend based upon said stored plurality of said indications and said load requests; and
   extrapolating the result obtained from said computing step for a plurality of successive future intervals.

7. The invention of claim 2 wherein the step of regulating includes the steps of:
   identifying the worst case one of said comparisons; and
   maintaining said worst case comparison as the standard for regulating the operation of said devices.

8. The invention of claim 1 or 2 wherein the step of monitoring includes the step of:
   registering the load request presented by the shed ones of said devices.

9. The invention of claim 8 wherein the step of storing includes the step of:
   storing a plurality of consecutive ones of said load requests.

10. The invention of claim 9 wherein the step of predicting includes the steps of:
    summing the current load presented by said active ones of said devices plus said load presented by said shed ones of said devices; and
    extrapolating the result obtained from said summing step for a plurality of successive future intervals.

11. The invention of claim 9 wherein the step of predicting includes the steps of:
    computing the load trend based upon said stored plurality of said indications and said load requests; and
    extrapolating the result obtained from said computing step for a plurality of successive future intervals.

12. The invention of claim 2 wherein the step of comparing includes the step of:
    weighting each of said plurality of sets of data as a function of the number of said indications contained in said set of data.

13. The invention of claim 1 or 2 wherein the step of regulating includes the steps of:
    identifying the worst case one of said weighted sets of data; and
    maintaining said worst case comparison as the standard for regulating the operation of said devices.

14. A device control system for controlling the operation of a plurality of devices which are connected to said device control system comprising:
    means for monitoring the load presented by the active ones of said devices;
    means responsive to said monitoring means for identifying which of said active devices are to be placed in an inactive state to prevent the overall load from exceeding a defined limit including:
    means responsive to said monitoring means for storing a record of the load presented by the active ones of said devices over n of the most recent intervals of time;
    means responsive to said storing means for producing a sum of the loads for each of n time periods, where i is an integer which varies from 1 to n, comprising:
    means responsive to said storage means for replacing the record of the load presented during the (n−i)th least recent one of said intervals of time with the load estimated to be presented during the i-th successive future interval of time,
    means responsive to said replacing means for summing the (n−i) remaining indications and the i estimations,
    means responsive to said summing means for comparing each of said n sums with a predetermined threshold to thereby identify the ones of said active loads to be shed to reduce the load below said threshold;
    means responsive to said comparing means for placing said identified active devices in the inactive state.

15. The invention of claim 14 wherein said monitoring means includes:
    means connected to each of said plurality of devices for generating a signal indicative of said activity level for each of active devices.

16. The invention of claim 15 wherein said monitoring means includes:
    means responsive to said sampling means for storing said sample of said activity level signal for each of said active ones of said devices.

17. A device control system for controlling the operation of a plurality of devices which are connected to said device control system comprising:
    means connected to said plurality of devices for monitoring the activity level of the active one of said devices;
    means responsive to said monitoring means for assigning an activity level to each of the inactive ones of said devices;
    means responsive to said monitoring means and said assigning means for predicting future device activity for all of said devices;
    means responsive to both said monitoring means said predicting means for identifying the ones of said devices which must be disabled to prevent device activity from exceeding a predetermined threshold;
    means connected to said plurality of devices and responsive to said identifying means for disabling the operation of said identified ones of said devices.

18. The invention of claim 17 wherein said monitoring means includes:
    means connected to said generating means for sampling said activity level signal during each interval of time called a monitoring interval.

19. The invention of claim 18 wherein said predicting means includes:
    means responsive to said storage means for producing a signal indicative of the activity level of each of said plurality of devices for a plurality of future ones of said monitoring intervals.

20. The invention of claim 19 wherein said determining means includes:
    means responsive to said control file means and said calculating means for identifying the ones of said plurality of devices which must be disabled to prevent said calculated rate of device activity from exceeding said predetermined threshold.

21. The invention of claim 20 wherein said calculating means is responsive to said time shifting means for calculating said rate of device activity for each of said n time shifted demand intervals.

22. The invention of claim 19 wherein said determining means includes:
means responsive to said calculating means for time shifting said demand interval n times such that the current monitoring interval appears on each possible monitoring interval position in said demand interval.

23. The invention of claim 22 wherein said determining means includes:
means responsive to said control file means said calculating means and said time shifting means for indentifying the ones of said plurality of devices which must be disabled to prevent said calculated rate of device activity from exceeding said predetermined threshold for each of said n shifted demand intervals.

24. The invention of claim 17 wherein said assigning means includes:
control file means responsive to said determining means for storing information indicative of the ones of said devices that are disabled.

25. The invention of claim 24 wherein said determining means includes:
means responsive to said producing means and said storing means for calculating the rate of device activity for a predetermined demand interval comprising n of said monitoring intervals.

* * * * *